(12) United States Patent
Zoo et al.

(10) Patent No.: US 11,543,025 B2
(45) Date of Patent: Jan. 3, 2023

(54) METHOD AND SYSTEM FOR PREVENTING MISOPERATION OF ELECTRIC TRANSMISSION

(71) Applicants: Hyundai Motor Company, Seoul (KR); Kia Corporation, Seoul (KR)

(72) Inventors: Hee En Zoo, Goyang-si (KR); Min Gi Song, Seoul (KR); Eun Sik Kim, Gwangmyeon-si (KR); Ki Young Song, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/511,410

(22) Filed: Oct. 26, 2021

(65) Prior Publication Data
US 2022/0290754 A1 Sep. 15, 2022

(30) Foreign Application Priority Data
Mar. 9, 2021 (KR) .......................... 10-2021-0030995

(51) Int. Cl.
| | |
|---|---|
| *F16H 61/18* | (2006.01) |
| *F16H 59/44* | (2006.01) |
| *F16H 61/02* | (2006.01) |
| *F16H 59/70* | (2006.01) |
| *F16H 59/58* | (2006.01) |

(52) U.S. Cl.
CPC ............. *F16H 61/18* (2013.01); *F16H 59/44* (2013.01); *F16H 59/58* (2013.01); *F16H 59/70* (2013.01); *F16H 61/0213* (2013.01)

(58) Field of Classification Search
CPC .......... F16H 59/44; F16H 59/58; F16H 59/70; F16H 61/0213; F16H 61/16; F16H 61/18
See application file for complete search history.

(56) References Cited

U.S. PATENT DOCUMENTS

| | | | | |
|---|---|---|---|---|
| 2,925,061 | A * | 2/1960 | Thornburgh | ........... B60K 37/00 116/DIG. 20 |
| 3,299,732 | A * | 1/1967 | Loofbourrow | ............ F02C 7/36 477/30 |
| 5,784,917 | A * | 7/1998 | Hayward | ................ F16H 61/16 74/335 |
| 6,553,858 | B1 * | 4/2003 | Kim | ........................ F16H 61/22 74/473.18 |
| 2009/0218160 | A1 * | 9/2009 | Baluch | ................... B60K 20/06 180/336 |

(Continued)

FOREIGN PATENT DOCUMENTS

| KR | 10-1565027 B1 | 10/2015 |
|---|---|---|
| KR | 10-2022-0070931 A | 5/2022 |

*Primary Examiner* — Edwin A Young
(74) *Attorney, Agent, or Firm* — Morgan, Lewis & Bockius LLP

(57) ABSTRACT

A method and system for preventing misoperation of an electronic transmission, may include monitoring an operation signal of a transmission and an operation signal of a manipulation device provided around the transmission, by a controller, and upon detecting the operation signal of the transmission immediately after the operation signal of the manipulation device is detected, controlling, by the controller, a gear stage by disregarding the operation signal of the transmission and maintaining a current gear stage.

18 Claims, 6 Drawing Sheets

(56) References Cited

U.S. PATENT DOCUMENTS

| | | | |
|---|---|---|---|
| 2015/0006040 A1* | 1/2015 | Pierallini | B60W 10/20 701/48 |
| 2015/0203127 A1* | 7/2015 | Sugiura | F16H 61/16 701/48 |
| 2016/0137217 A1* | 5/2016 | Golomb | B62D 1/046 74/471 R |
| 2017/0284537 A1* | 10/2017 | Kojima | F16H 61/0204 |
| 2021/0094543 A1* | 4/2021 | Barone | F16H 61/0202 |

* cited by examiner

METHOD AND SYSTEM FOR PREVENTING MISOPERATION OF ELECTRIC TRANSMISSION

CROSS-REFERENCE TO RELATED APPLICATION

The present application claims priority to Korean Patent Application No. 10-2021-0030995, filed on Mar. 9, 2021, the entire contents of which is incorporated herein for all purposes by this reference.

BACKGROUND OF THE INVENTION

Field of the Invention

The present invention relates to a method and system for preventing misoperation of an electronic transmission for preventing gear shifting due to misoperation of a transmission during a procedure of manipulating other manipulation devices provided around the electronic transmission.

Description of Related Art

A conventional electronic transmission includes a sensing structure for shifting into reverse (R)/neutral (N)/drive (D) and a sensing structure for shifting into park (P).

The electronic transmission separately includes a shifting switch for shifting into R/N/D and a printed circuit board and a shifting switch for shifting into P to form a speed stage required for driving.

However, in the case of a column type electronic transmission provided behind a steering wheel, there is a problem in that a driver accidentally and unintentionally misoperates the electronic transmission while manipulating a steering wheel, a wiper, and a direction indicator.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and system for preventing misoperation of an electronic transmission for preventing gear shifting due to misoperation of a transmission during a procedure of manipulating other manipulation devices provided around the electronic transmission.

In accordance with an aspect of the present invention, the above and other objects may be accomplished by the provision of a method of preventing misoperation of an electronic transmission, the method including monitoring an operation signal of a transmission and an operation signal of a manipulation device provided around the transmission, by a controller, and upon detecting the operation signal of the transmission immediately after the operation signal of the manipulation device is detected, controlling, by the controller, a gear stage by disregarding the operation signal of the transmission and maintaining a current gear stage.

The manipulation device and the transmission may be provided at a same side as a steering column.

The operation signal of the manipulation device may be an operation signal of a wiper.

The operation signal of the manipulation device may be a steering signal of a steering wheel.

The operation signal of the manipulation device may be an operation signal of a direction indicator.

The controlling the gear stage may include, upon detecting the operation signal of the manipulation device after the operation signal of the transmission is detected, determining, by the controller, whether gear shifting into a target gear stage is performed based on a current gear stage, the target gear stage, and a vehicle speed condition.

When the current gear stage is a stop stage and the target gear stage is a driving stage, gear shifting into the target gear stage may be performed.

When the current gear stage is a driving stage and the target gear stage is a stop stage, gear shifting into the target gear stage may be performed.

When the current gear stage is a forward driving stage or a backward driving stage and a target driving stage is a gear stage into which a driving direction of the current driving stage is shifted, a vehicle speed may be detected, and when the vehicle speed is equal to or less than a predetermined vehicle speed, gear shifting into the target gear stage may be performed.

When the vehicle speed is greater than the predetermined vehicle speed, the current gear stage may be maintained.

The controlling the gear stage may include warning a driver of impossibility of the gear shifting into the target gear stage when the current gear stage is maintained despite manipulation of the transmission.

In accordance with another aspect of the present invention, there is provided a system for preventing misoperation of an electronic transmission, the system including a transmission configured to change a gear stage through a shifting operation, a manipulation device provided around the transmission for performing a function required to drive a vehicle, and a controller configured to monitor an operation signal of the transmission and an operation signal of the manipulation device and configured to, upon detecting the operation signal of the transmission during monitoring immediately after the operation signal of the manipulation device is detected, control a gear stage by disregarding the operation signal of the transmission and maintaining a current gear stage.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
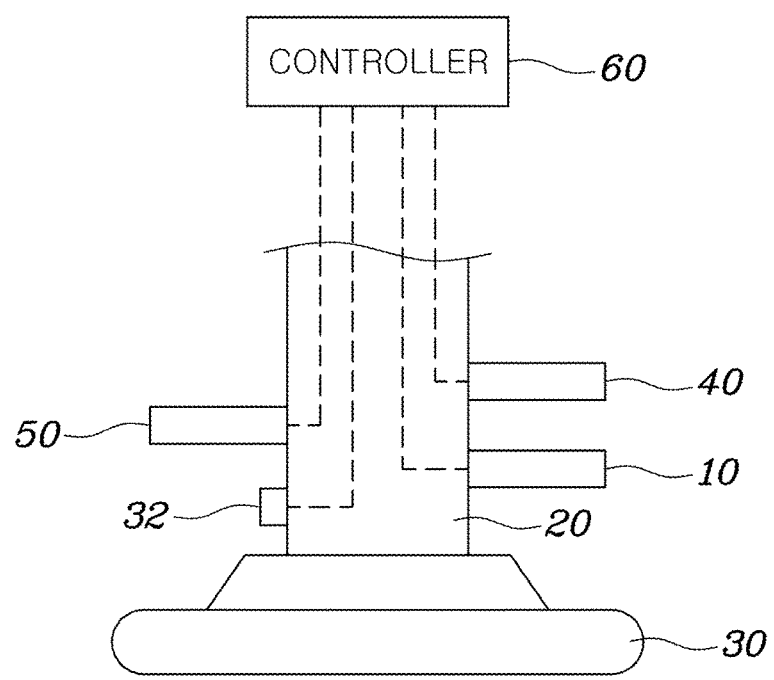
FIG. 1 is a diagram showing an example of the state in which an electronic transmission and a manipulation device are provided according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a light module for a vehicle according to exemplary embodiments of the present invention will be described with reference to the accompanying drawings.

FIG. 1 is a diagram showing an example of the state in which an electronic transmission 10 and a manipulation device are provided according to various exemplary embodiments of the present invention.

Referring to the drawing, a system for preventing misoperation of an electronic transmission according to various exemplary embodiments of the present invention may include a transmission 10 for changing a gear stage through a shifting operation, a manipulation device provided around the transmission 10 to perform a function required to drive a vehicle, and a controller 60 for monitoring an operation signal of the transmission 10 and an operation signal of the manipulation device, and the controller 60 for performing control to disregard the operation signal of the transmission 10 and to maintain the current gear stage upon detecting the operation of the transmission 10 immediately after the operation signal of the manipulation device during the monitoring procedure.

For example, the transmission 10 may be the electronic transmission 10 applied to a shift-by-wire system and may be formed like a bar an end to be rotated or pushed to selectively configure P, R, N, and D according to such manipulation of rotation and push.

Although the transmission 10 is illustrated as being provided at one side of a steering column 20 and may be provided in various positions such as a steering wheel 30, a console, or a crash pad as well as the steering column 20.

The manipulation device may be provided around the transmission 10, and when the transmission 10 is provided at one side of the steering column 20, the manipulation device may be the steering wheel 30, a wiper 40, a direction indicator 50, or the like.

The operation signals of the transmission 10 and the manipulation device may be input to the controller 60, and the controller 60 may determine whether the transmission 10 is misoperated based on the operation signals and may perform control for determining whether gear shifting is performed. For reference, the controller 60 may be a Transmission Control Unit (TCU) or a VCU for controlling gear shifting of the vehicle.

That is, upon detecting the operation signal of the transmission 10 within a predetermined time period in the state in which the operation signal of the manipulation device is first detected, the current situation may be determined as a situation in which the transmission 10 positioned close to the manipulation device is unintentionally misoperated while operating the manipulation device. In the instant case, a shift operation signal of the transmission 10 may be disregarded, and the current gear stage may be maintained.

Accordingly, the gear stage may be prevented from being changed due to misoperation of the transmission 10, greatly improving the stability of driving of the vehicle, and misoperation of the transmission 10 may be prevented using only logic, reducing costs.

A method of preventing misoperation of the electronic transmission 10 according to various exemplary embodiments of the present invention may include monitoring an operation signal of the transmission 10 and an operation signal of the manipulation device provided around the transmission 10 by the controller 60, and upon detecting the operation signal of the transmission 10 immediately after the operation signal of the manipulation device is detected, controlling a gear stage by disregarding the operation signal of the transmission 10 and maintaining the current gear stage by the controller 60.

For reference, the controller 60 according to various exemplary embodiments of the present invention may be embodied through a non-volatile memory configured to store an algorithm for controlling operations of various components of a vehicle or data related to a software command for reproducing the algorithm and a processor configured to perform an operation to be described below using the data stored in the corresponding memory. Here, the memory and the processor may be embodied as separate chips. Alternatively, the memory and the processor may be configured in a single integrated chip. The processor may be provided as one or more processors.

According to various exemplary embodiments of the present invention, the manipulation device and the transmission 10 may be provided at the same side as that of the steering column 20.

For example, when the transmission 10 is provided at one side of the steering column 20, the manipulation device may also be provided at one side of the steering column 20. However, the transmission 10 and the manipulation device may be provided up and down or back and forth, respectively, and thus, installation positions thereof do not overlap each other.

That is, a storage space of a console may be greatly increased and misoperation of a transmission may be prevented due to the increased storage space by applying the transmission 10 to the steering column 20, improving the marketability of the vehicle.

In detail, as shown in FIG. 1, when the transmission 10 and a wiper switch are provided on the right side of the steering column 20, the wiper switch (hereinafter referred to as the "wiper") may be a manipulation device.

In the instant case, the operation signal of the manipulation device may be an operation signal of the wiper 40, and the operation signal of the wiper 40 may be monitored by the controller 60.

Figure 2:
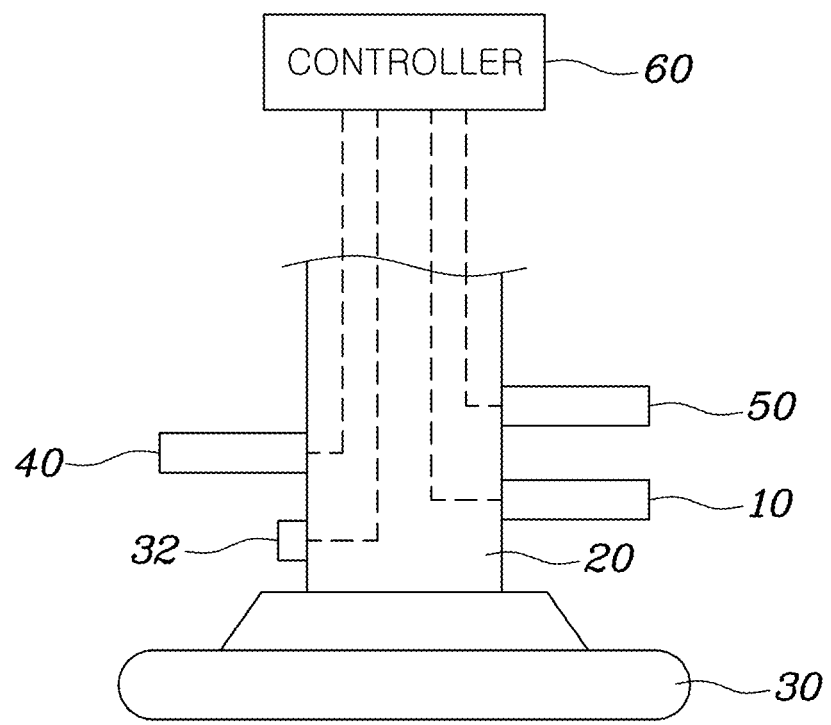
FIG. 2 is a diagram showing another example of the state in which an electronic transmission and a manipulation device are provided according to various exemplary embodiments of the present invention.

As shown in FIG. 2, when the transmission 10 and a switch of the direction indicator 50 are provided on the right side of the steering column 20, the switch of the direction indicator (hereinafter referred to as the "direction indicator") may be the manipulation device.

In the instant case, the operation signal of the manipulation device may be an operation signal of the direction indicator 50, and the operation signal of the direction indicator 50 may be monitored by the controller 60.

When the manipulation device is the steering wheel 30, the operation signal of the manipulation device may be a steering signal of the steering wheel 30, and the steering signal of the steering wheel 30 may be monitored by the controller 60. The steering signal may be a signal detected through a steering angle sensor 32 or a torque sensor.

In the controlling of the gear stage, upon detecting the operation signal of the manipulation device immediately after the operation signal of the transmission 10 is detected, whether a gear stage is changed to a target gear stage may be determined based on the current gear stage, a target gear stage, and a vehicle speed condition.

That is, upon detecting the operation signal of the manipulation device in the state in which the shift operation signal of the transmission 10 is first detected, the gear stage and the vehicle speed condition may be further determined and then whether gear shifting is performed may be determined.

First, when the current gear stage is a stop stage and the target gear stage is a driving stage, gear shifting may be performed to the target gear stage.

For example, when gear shifting into D from a stop stage such as P or N is performed, the current state is a safe state in which a vehicle is currently stopped, and thus gear shifting into D may be performed.

When gear shifting into R from the stop stage such as P or N is performed, the current state is a safe state in which a vehicle is currently stopped, and thus gear shifting into R may be performed.

Accordingly, when the current gear stage is a driving stage and the target gear stage is a stop stage, gear shifting into the target gear stage may be performed.

For example, when gear shifting into P or N from D is performed, the current condition is a condition for change to a safe state in which the vehicle is stopped, and thus gear shifting may be performed.

Furthermore, when gear shifting into P or N from the R stage is performed, the current condition is a condition for change to the safe state in which the vehicle is stopped, and thus gear shifting may be performed.

When the current gear stage is a forward driving stage or a backward driving stage and a target driving stage is a gear stage for changing a driving direction from the current driving stage, a vehicle speed may be detected, and when the vehicle speed is equal to or less than a predetermined vehicle speed, gear shifting into the target gear stage may be performed.

In contrast, when the vehicle speed is greater than a predetermined vehicle speed, control may be performed to maintain the current gear stage.

For example, when gear shifting into R from the current D is performed, a vehicle speed may be further monitored.

As the monitoring result, when the vehicle speed is equal to or less than a predetermined vehicle speed (e.g., 7 km/h), gear shifting into R may be performed, and when the vehicle speed is greater than the predetermined vehicle speed, D may be maintained without gear shifting.

When gear shifting into D from the current R is performed, the vehicle speed may also be monitored.

As the monitoring result, when the vehicle speed is equal to or less than a predetermined vehicle speed (e.g., 7 km/h), gear shifting into D may be performed, and when the vehicle speed is greater than the predetermined vehicle speed, R may be maintained without gear shifting.

In the controlling of the gear stage, when the current gear stage is maintained despite manipulation of the transmission 10, warning of impossibility of changing the gear stage to the target gear stage may be indicated.

For example, as a method of warning a driver of impossibility of gear shifting, visual feedback may be provided by popping up a warning on a cluster, audible feedback may be provided by generating an alarm, or tactile feedback may be provided by generating haptic feedback on the steering wheel 30.

Among these warning methods, one method may be selectively provided or two or more methods may be combined and provided.

Figure 3:
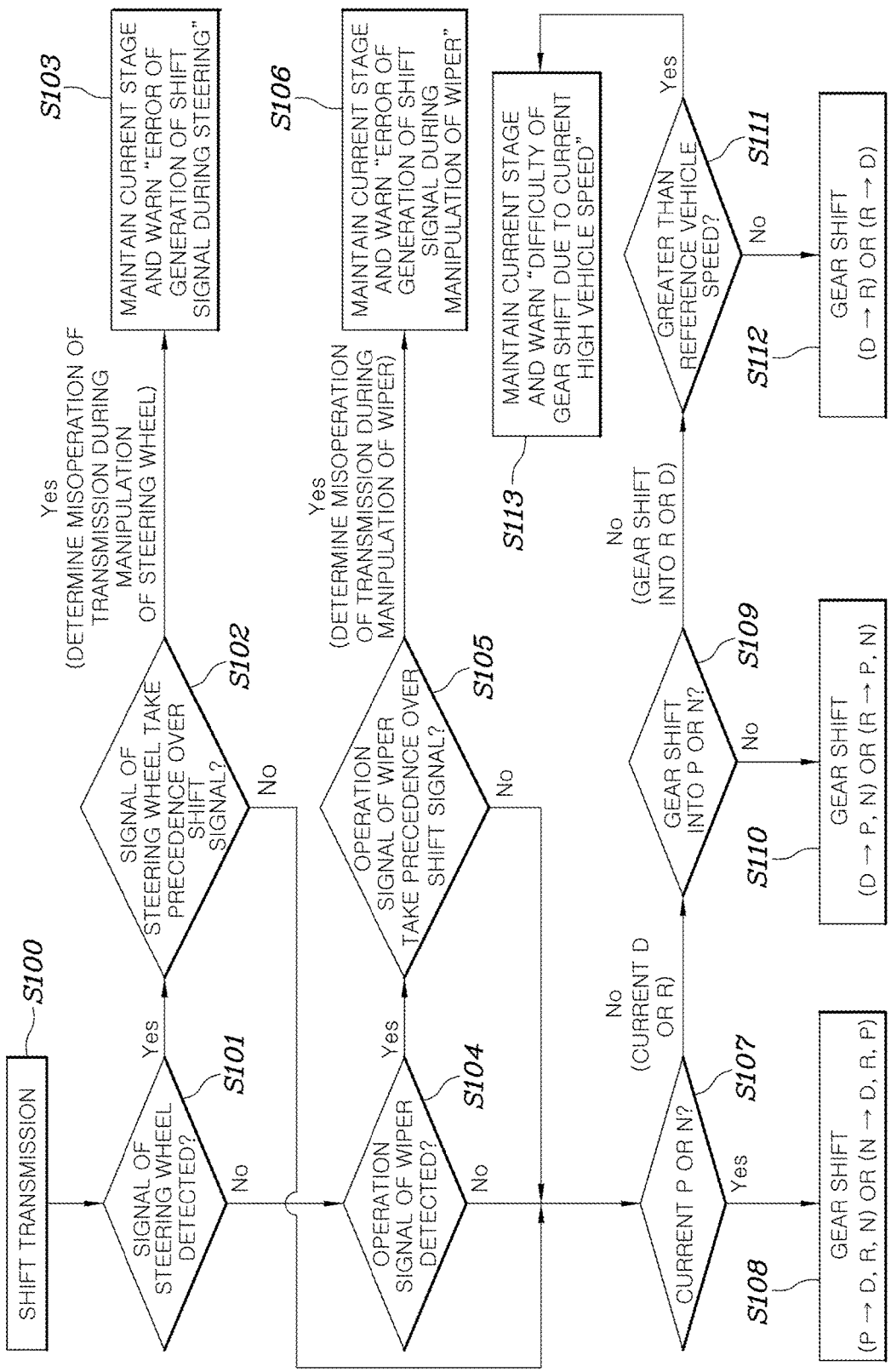
FIG. 3 is a flowchart showing misoperation prevention logic according to various exemplary embodiments of the present invention.

FIG. 3 is a flowchart showing a misoperation prevention logic according to various exemplary embodiments of the present invention.

With reference to the drawing, the overall control flow of the misoperation prevention logic according to various exemplary embodiments of the present invention is now described. When a shift signal of the transmission 10 is input while a vehicle travels (S100), whether the steering signal of the steering wheel 30 is input may be determined (S101).

As the determination result of operation S101, when the steering signal of the steering wheel 30 is input, priority between the shift signal and the steering signal may be determined (S102).

As the determination result of operation S102, when the steering signal of the steering wheel 30 is input before the shift signal, the current situation may be determined as a situation in which the transmission 10 is unintentionally operated while the steering wheel 30 is manipulated, and the current gear stage may be maintained without gear shifting into the target gear stage (S103).

The driver may be warned that the transmission 10 is misoperated while the steering wheel 30 is manipulated and gear shifting is not performed.

In contrast, as the determination result of operation S101, when the steering signal of the steering wheel 30 is not input, whether an operation signal of the wiper 40 is input may be determined (S104).

As the determination result of operation S104, when the operation signal of the wiper 40 is input, priority between the shift signal and the operation signal of the wiper 40 may be determined (S105).

As the determination result of operation S105, when the operation signal of the wiper 40 is input before the shift signal, the current situation may be determined as a situation in which the transmission 10 is unintentionally operated while the wiper 40 is manipulated, and the current gear stage may be maintained without gear shifting into the target gear stage (S106).

The driver may be warned that the transmission 10 is misoperated while the wiper 40 is manipulated and gear shifting is not performed.

In contrast, as the determination result of operation S104, when the operation signal of the wiper 40 is not input, or the shift signal is input before the operation signal of the manipulation device in operations S102 and S105, whether the current gear stage is P or N may be determined (S107).

As the determination result of operation S107, when the current gear stage is P or N, in the case of gear shifting into D or R, gear shifting into D or R may be performed (S108). Needless to say, gear shifting may also be performed in the case of gear shifting into N from P or gear shifting into P from N.

In contrast, as the determination result of operation S107, when the current gear stage is neither P nor N, the current gear stage may be determined as D or R. In the case of gear shifting into P or N from D or R (S109), gear shifting into P or N may be performed (S110).

In contrast, as the determination result of operation S109, when gear shifting into D from the current R is requested or gear shifting into R from the current D is requested, whether the vehicle speed is equal to or less than 7 km/h may be determined (S111).

As the determination result of operation S111, when the vehicle speed is equal to or less than 7 km/h, gear shifting into R from D may be performed, and in the case of gear shifting into D from R, gear shifting may also be performed (S112).

However, as the determination result of operation S111, when the vehicle speed is greater than 7 km/h, gear shifting into the target gear stage may not be performed and the current gear stage may be maintained (S113).

Furthermore, the driver may be warned that gear shifting is not performed because the current vehicle speed is high.

Figure 4:
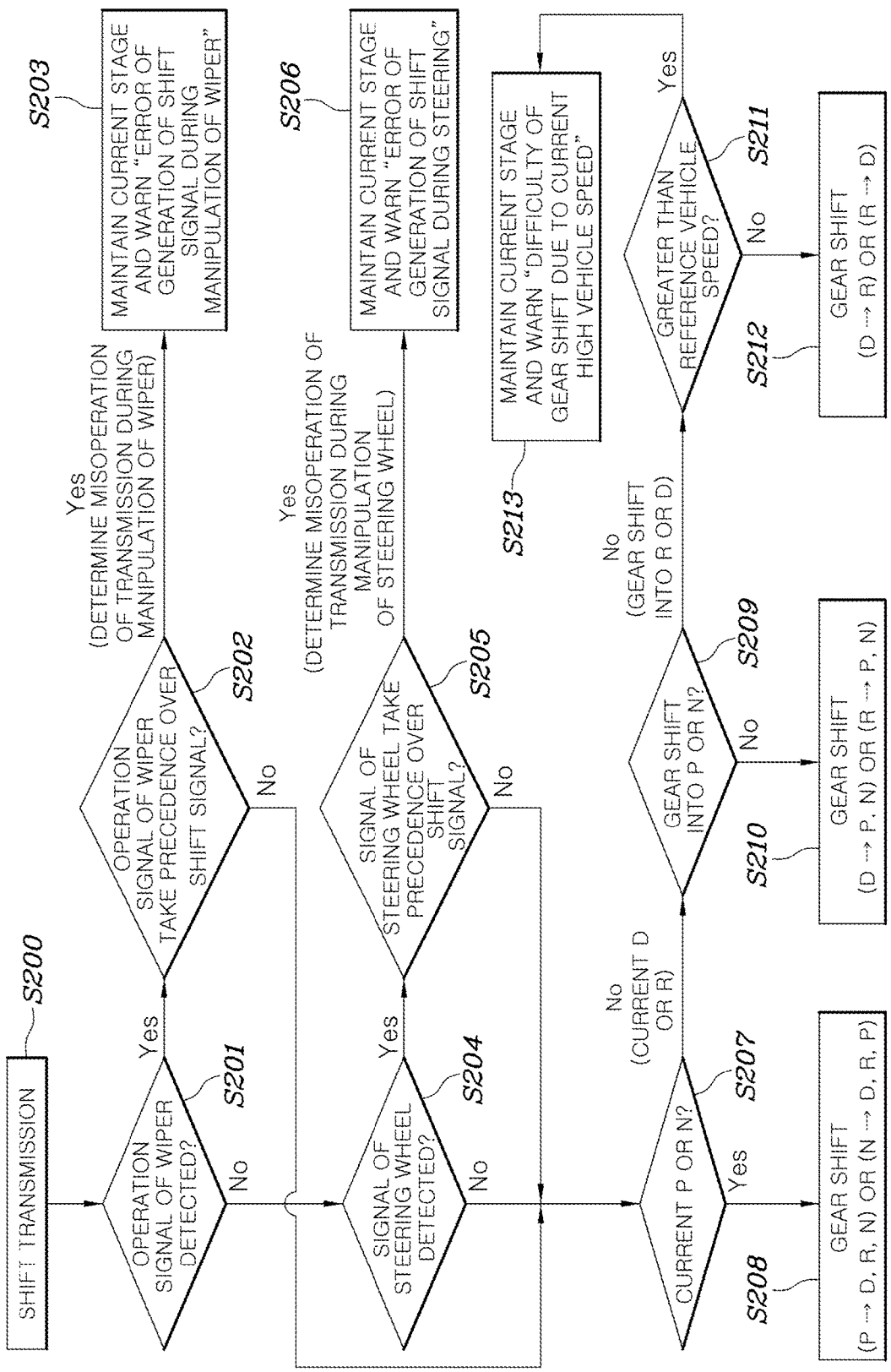
FIG. 4 is a flowchart of misoperation prevention logic according to various exemplary embodiments of the present invention.

FIG. 4 is a flowchart of misoperation prevention logic according to various exemplary embodiments of the present invention. The misoperation prevention logic of FIG. 4 may be obtained by reversing sequences of the steering signal of the steering wheel 30 and the operation signal of the wiper 40 in the various exemplary embodiments shown in FIG. 3.

Referring to the drawing, when a shift signal of the transmission 10 is input while a vehicle travels (S200), whether the operation signal of the wiper 40 is input may be determined (S201).

As the determination result of operation S201, when the operation signal of the wiper 40 is input, priority between the shift signal and the operation signal of the wiper 40 may be determined (S202).

As the determination result of operation S202, when the operation signal of the wiper 40 is input before the shift signal, the current situation may be determined as a situation in which the transmission 10 is unintentionally operated while the wiper 40 is manipulated, and the current gear stage may be maintained without gear shifting into the target gear stage (S203).

The driver may be warned that the transmission 10 is misoperated while the wiper 40 is manipulated and gear shifting is not performed.

In contrast, as the determination result of operation S201, when the operation signal of the wiper 40 is not input, whether a steering signal of the steering wheel 30 is input may be determined (S204).

As the determination result of operation S204, when the steering signal of the steering wheel 30 is input, priority between the shift signal and the steering signal may be determined (S205).

As the determination result of operation S205, when the steering signal of the steering wheel 30 is input before the shift signal, the current situation may be determined as a situation in which the transmission 10 is unintentionally operated while the steering wheel 30 is manipulated, and the current gear stage may be maintained without gear shifting into the target gear stage (S206).

The driver may be warned that the transmission 10 is misoperated while the steering wheel 30 is manipulated and gear shifting is not performed.

In contrast, as the determination result of operation S204, when the steering signal of the steering wheel 30 is not input, or the shift signal is input before the operation signal of the manipulation device in operations S202 and S205, whether the current gear stage is P or N may be determined (S207).

As the determination result of operation S207, when the current gear stage is P or N, in the case of gear shifting into D or R, gear shifting into D or R may be performed (S208). Needless to say, gear shifting may also be performed in the case of gear shifting into N from P or gear shifting into P from N.

In contrast, as the determination result of operation S207, when the current gear stage is neither P nor N, the current gear stage may be determined as D or R. In the case of gear shifting into P or N from D or R (S209), gear shifting into P or N may be performed (S210).

In contrast, as the determination result of operation S209, when gear shifting into D from the current R is requested or gear shifting into R from the current D is requested, whether the vehicle speed is equal to or less than 7 km/h may be determined (S211).

As the determination result of operation S211, when the vehicle speed is equal to or less than 7 km/h, gear shifting into R from D may be performed, and in the case of gear shifting into D from R, gear shifting may also be performed (S212).

However, as the determination result of operation S211, when the vehicle speed is greater than 7 km/h, gear shifting into the target gear stage may not be performed and the current gear stage may be maintained (S213).

Furthermore, the driver may be warned that gear shifting is not performed because the current vehicle speed is high.

Figure 5:
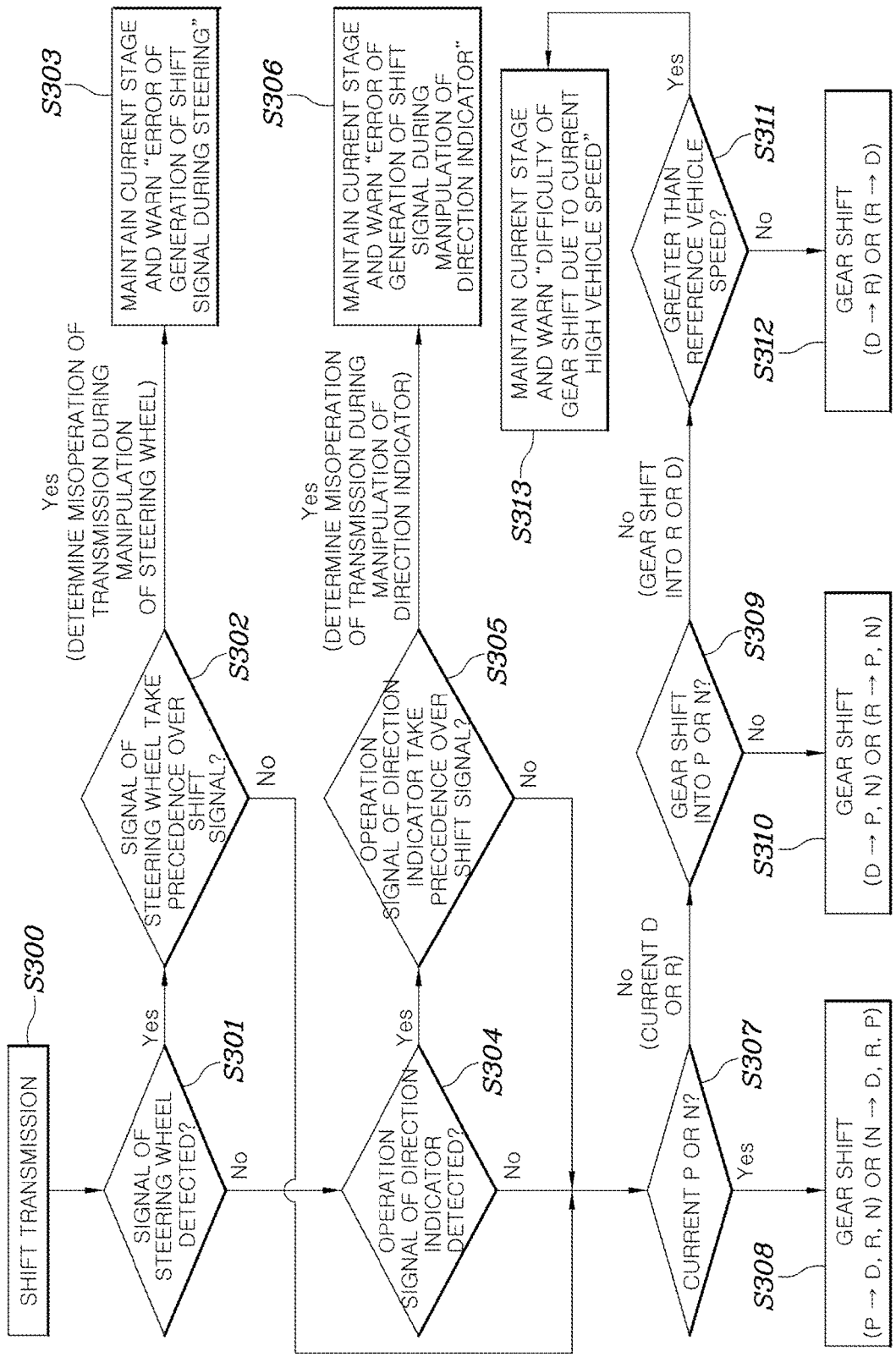
FIG. 5 is a flowchart of misoperation prevention logic according to various exemplary embodiments of the present invention.

FIG. 5 is a flowchart of a misoperation prevention logic according to various exemplary embodiments of the present invention. The misoperation prevention logic of FIG. 5 may be obtained by applying the operation signal of the direction indicator 50 instead of the operation signal of the wiper 40 in the various exemplary embodiments shown in FIG. 3.

Referring to the drawing, when a shift signal of the transmission 10 is input while a vehicle travels (S300), whether the steering signal of the steering wheel 30 is input may be determined (S301).

As the determination result of operation S301, when the steering signal of the steering wheel 30 is input, priority between the shift signal and the steering signal may be determined (S302).

As the determination result of operation S302, when the steering signal of the steering wheel 30 is input before the shift signal, the current situation may be determined as a situation in which the transmission 10 is unintentionally operated while the steering wheel 30 is manipulated, and the current gear stage may be maintained without gear shifting into the target gear stage (S303).

The driver may be warned that the transmission 10 is misoperated while the steering wheel 30 is manipulated and gear shifting is not performed.

In contrast, as the determination result of operation S301, when the steering signal of the steering wheel 30 is not input, whether an operation signal of the direction indicator 50 is input may be determined (S304).

As the determination result of operation S304, when the operation signal of the direction indicator 50 is input, priority between the shift signal and the operation signal of the direction indicator 50 may be determined (S305).

As the determination result of operation S305, when the operation signal of the direction indicator 50 is input before the shift signal, the current situation may be determined as a situation in which the transmission 10 is unintentionally operated while the direction indicator 50 is manipulated, and the current gear stage may be maintained without gear shifting into the target gear stage (S306).

The driver may be warned that the transmission 10 is misoperated while the direction indicator 50 is manipulated and gear shifting is not performed.

In contrast, as the determination result of operation S304, when the operation signal of the direction indicator 50 is not input, or the shift signal is input before the operation signal of the manipulation device in operations S302 and S305, whether the current gear stage is P or N may be determined (S307).

As the determination result of operation S307, when the current gear stage is P or N, in the case of gear shifting into D or R, gear shifting into D or R may be performed (S308). Needless to say, gear shifting may also be performed in the case of gear shifting into N from P or gear shifting into P from N.

In contrast, as the determination result of operation S307, when the current gear stage is neither P nor N, the current gear stage may be determined as D or R. In the case of gear shifting into P or N from D or R (S309), gear shifting into P or N may be performed (S310).

In contrast, as the determination result of operation S309, when gear shifting into D from the current R is requested or gear shifting into R from the current D is requested, whether the vehicle speed is equal to or less than 7 km/h may be determined (S311).

In contrast, as the determination result of operation S311, when the vehicle speed is equal to or less than 7 km/h, gear shifting into R from D may be performed, and in the case of gear shifting into D from R, gear shifting may also be performed (S312).

However, as the determination result of operation S311, when the vehicle speed is greater than 7 km/h, gear shifting into the target gear stage may not be performed and the current gear stage may be maintained (S313).

Furthermore, the driver may be warned that gear shifting is not performed because the current vehicle speed is high.

Figure 6:
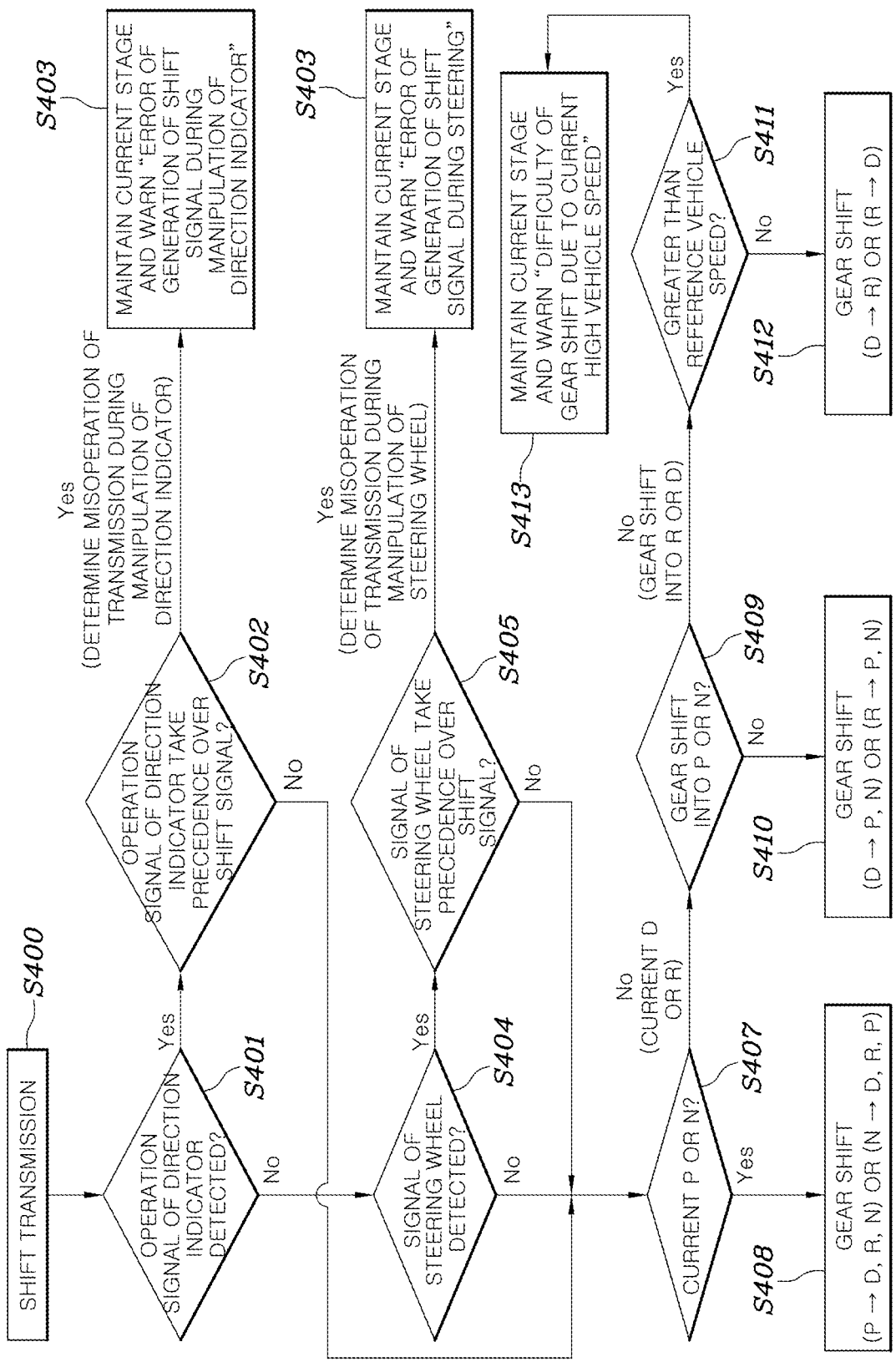
FIG. 6 is a flowchart of misoperation prevention logic according to various exemplary embodiments of the present invention.

FIG. 6 is a flowchart of a misoperation prevention logic according to various exemplary embodiments of the present invention. The misoperation prevention logic of FIG. 6 may be obtained by reversing sequences of the steering signal of the steering wheel 30 and the operation signal of the direction indicator 50 in the various exemplary embodiments shown in FIG. 5.

Referring to the drawing, when a shift signal of the transmission 10 is input while a vehicle travels (S400), whether the operation signal of the direction indicator 50 is input may be determined (S401).

As the determination result of operation S401, when the operation signal of the direction indicator 50 is input, priority between the shift signal and the operation signal of the direction indicator 50 may be determined (S402).

As the determination result of operation S402, when the operation signal of the direction indicator 50 is input before the shift signal, the current situation may be determined as a situation in which the transmission 10 is unintentionally operated while the direction indicator 50 is manipulated, and the current gear stage may be maintained without gear shifting into the target gear stage (S403).

The driver may be warned that the transmission 10 is misoperated while the direction indicator 50 is manipulated and gear shifting is not performed.

In contrast, as the determination result of operation S401, when the operation signal of the direction indicator 50 is not input, whether the steering signal of the steering wheel 30 is input may be determined (S404).

As the determination result of operation S404, when the steering signal of the steering wheel 30 is input, priority between the shift signal and the steering signal may be determined (S405).

As the determination result of operation S405, when the steering signal of the steering wheel 30 is input before the shift signal, the current situation may be determined as a situation in which the transmission 10 is unintentionally operated while the steering wheel 30 is manipulated, and the current gear stage may be maintained without gear shifting into the target gear stage (S406).

The driver may be warned that the transmission 10 is misoperated while the steering wheel 30 is manipulated and gear shifting is not performed.

In contrast, as the determination result of operation S404, when the steering signal of the steering wheel 30 is not input, or the shift signal is input before the operation signal of the manipulation device in operations S402 and S405, whether the current gear stage is P or N may be determined (S407).

As the determination result of operation S407, when the current gear stage is P or N, in the case of gear shifting into D or R, gear shifting into D or R may be performed (S408). Needless to say, gear shifting may also be performed in the case of gear shifting into N from P or gear shifting into P from N.

In contrast, as the determination result of operation S407, when the current gear stage is neither P nor N, the current gear stage may be determined as D or R. In the case of gear shifting into P or N from D or R (S409), gear shifting into P or N may be performed (S410).

In contrast, as the determination result of operation S409, when gear shifting into D from the current R is requested or gear shifting into R from the current D is requested, whether the vehicle speed is equal to or less than 7 km/h may be determined (S411).

As the determination result of operation S411, when the vehicle speed is equal to or less than 7 km/h, gear shifting into R from D may be performed, and in the case of gear shifting into D from R, gear shifting may also be performed (S412).

However, as the determination result of operation S411, when the vehicle speed is greater than 7 km/h, gear shifting into the target gear stage may not be performed and the current gear stage may be maintained (S413).

Furthermore, the driver may be warned that gear shifting is not performed because the current vehicle speed is high.

As described above, according to various exemplary embodiments of the present invention, upon detecting the operation signal of the transmission 10 within a predetermined time period in the state in which an operation signal of a manipulation device is first detected, the current situation may be determined as a situation in which the transmission 10 positioned close to the manipulation device is unintentionally operated while operating the manipulation device, the shift operation signal of the transmission 10 may be disregarded, and the current gear stage may be maintained.

Accordingly, the gear stage may be prevented from being changed due to misoperation of the transmission 10, thereby greatly improving the stability of driving of the vehicle, and misoperation of the transmission 10 may be prevented using only logic, thereby reducing costs.

A storage space of a console may be greatly increased and misoperation of a transmission may be prevented due to the increased storage space by applying the transmission 10 to the steering column 20, thereby improving the marketability of the vehicle.

Through the aforementioned solutions of the objectives, according to various exemplary embodiments of the present invention, upon detecting the operation signal of the transmission within a predetermined time period in the state in which an operation signal of a manipulation device is first detected, the current situation may be determined as a situation in which the transmission positioned close to the manipulation device is unintentionally operated while operating the manipulation device, the shift operation signal of the transmission may be disregarded, and the current gear stage may be maintained.

Accordingly, the gear stage may be prevented from being changed due to misoperation of the transmission, thereby greatly improving the stability of driving of the vehicle, and misoperation of the transmission may be prevented using only logic, thereby reducing costs.

A storage space of a console may be greatly increased and misoperation of a transmission may be prevented due to the increased storage space by applying the transmission to the steering column, thereby improving the marketability of the vehicle.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of preventing misoperation of an electronic transmission, the method comprising:
   monitoring, by a controller, an operation signal of the electronic transmission and an operation signal of a manipulation device provided around the electronic transmission; and
   upon detecting the operation signal of the electronic transmission after the operation signal of the manipulation device is detected, controlling, by the controller, a gear stage by disregarding the operation signal of the electronic transmission and maintaining a current gear stage.

2. The method of claim 1, wherein the manipulation device and the electronic transmission are provided at a same side as a steering column.

3. The method of claim 1,
   wherein the manipulation device is a wiper, and
   wherein the operation signal of the manipulation device is an operation signal of the wiper.

4. The method of claim 1,
   wherein the manipulation device is a steering wheel, and
   wherein the operation signal of the manipulation device is a steering signal of the steering wheel.

5. The method of claim 1,
   wherein the manipulation device is a direction indicator, and
   wherein the operation signal of the manipulation device is an operation signal of the direction indicator.

6. The method of claim 1, wherein the controlling the gear stage includes:

upon detecting the operation signal of the manipulation device after the operation signal of the electronic transmission is detected, determining, by the controller, whether gear shifting into a target gear stage is performed based on the current gear stage, the target gear stage, and a vehicle speed condition.

7. The method of claim 6, further including:
performing the gear shifting into the target gear stage, when the controller concludes that the current gear stage is a stop stage and the target gear stage is a driving stage.

8. The method of claim 6, further including:
performing the gear shifting into the target gear stage, when the controller concludes that the current gear stage is a driving stage and the target gear stage is a stop stage.

9. The method of claim 6, further including:
detecting a vehicle speed, when the current gear stage is a forward driving stage or a backward driving stage and a target driving stage is a gear stage into which a driving direction of a current driving stage is shifted; and
performing the gear shifting into the target gear stage when the controller concludes that the vehicle speed is equal to or less than a predetermined vehicle speed.

10. The method of claim 9, further including:
maintaining, by the controller, the current gear stage when the controller concludes that the vehicle speed is greater than the predetermined vehicle speed.

11. The method of claim 1, wherein the controlling the gear stage includes:
warning, by the controller, a driver of impossibility of gear shifting into a target gear stage when the current gear stage is maintained despite manipulation of the electronic transmission.

12. A non-transitory computer readable storage medium on which a program for performing the method of claim 1 is recorded.

13. A system for preventing misoperation of an electronic transmission, the system comprising:
the electronic transmission configured to change a gear stage through a shifting operation;
a manipulation device provided around the electronic transmission for performing a function required to drive a vehicle; and
a controller configured to monitor an operation signal of the electronic transmission and an operation signal of the manipulation device and configured to, upon detecting the operation signal of the electronic transmission during monitoring after the operation signal of the manipulation device is detected, control a gear stage by disregarding the operation signal of the electronic transmission and maintaining a current gear stage.

14. The system of claim 13, wherein the controller is configured for determining whether gear shifting into a target gear stage is performed based on the current gear stage, the target gear stage, and a vehicle speed condition, when the controller detects the operation signal of the manipulation device after the operation signal of the electronic transmission is detected.

15. The system of claim 14, wherein the controller is configured for performing the gear shifting into the target gear stage, when the controller concludes that the current gear stage is a stop stage and the target gear stage is a driving stage.

16. The system of claim 14, wherein the controller is configured for performing gear the gear shifting into the target gear stage, when the controller concludes that the current gear stage is a driving stage and the target gear stage is a stop stage.

17. The system of claim 14, wherein the controller is configured for:
detecting a vehicle speed, when the current gear stage is a forward driving stage or a backward driving stage and a target driving stage is a gear stage into which a driving direction of a current driving stage is shifted; and
performing the gear shifting into the target gear stage when the controller concludes that the vehicle speed is equal to or less than a predetermined vehicle speed.

18. The system of claim 17, wherein the controller is configured for maintaining the current gear stage when the controller concludes that the vehicle speed is greater than the predetermined vehicle speed.

* * * * *